(12) United States Patent
Yamaguchi et al.

(10) Patent No.: US 7,279,845 B2
(45) Date of Patent: Oct. 9, 2007

(54) PLASMA PROCESSING METHOD AND APPARATUS

(75) Inventors: Koji Yamaguchi, Kanagawa-ken (JP); Toshiji Nishiguchi, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 11/080,550

(22) Filed: Mar. 16, 2005

(65) Prior Publication Data

US 2005/0212441 A1    Sep. 29, 2005

(30) Foreign Application Priority Data

Mar. 25, 2004 (JP) .............................. 2004-089541

(51) Int. Cl.
*H01J 7/24* (2006.01)

(52) U.S. Cl. .............................. 315/111.21; 315/111.31

(58) Field of Classification Search ........................ 315/111.01–111.91; 118/723, 728; 250/423
See application file for complete search history.

(56) References Cited

U.S. PATENT DOCUMENTS

| | | | | |
|---|---|---|---|---|
| 5,423,970 A | * | 6/1995 | Kugler ................... | 204/298.03 |
| 5,527,391 A | * | 6/1996 | Echizen et al. ............. | 118/719 |
| 6,037,717 A | * | 3/2000 | Maishev et al. ......... | 315/111.91 |
| 6,152,071 A | * | 11/2000 | Akiyama et al. ..... | 118/723 VE |
| 6,635,996 B1 | | 10/2003 | Nakajima et al. ....... | 315/111.21 |
| 6,885,153 B2 | * | 4/2005 | Quon ..................... | 315/111.31 |
| 2003/0009383 A1 | | 1/2003 | Mori et al. .................... | 705/28 |
| 2004/0025791 A1 | * | 2/2004 | Chen et al. ................. | 118/728 |
| 2004/0026372 A1 | * | 2/2004 | Takenaka et al. ............. | 216/71 |
| 2004/0056602 A1 | * | 3/2004 | Yang et al. ............. | 315/111.21 |
| 2005/0244310 A1 | | 11/2005 | Tamura et al. .................. | 438/3 |
| 2006/0175015 A1 | * | 8/2006 | Chen et al. ............ | 156/345.44 |
| 2006/0176045 A1 | * | 8/2006 | Dosaka et al. ........... | 324/76.12 |

FOREIGN PATENT DOCUMENTS

JP      2000-325735      11/2000

* cited by examiner

*Primary Examiner*—Trinh Dinh
*Assistant Examiner*—Tung X Le
(74) *Attorney, Agent, or Firm*—Fitzpatrick, Cella, Harper & Scinto

(57) ABSTRACT

A method and apparatus for processing a target substance by using atmospheric-pressure plasma produced by a composite waveform generated by superimposing a high-frequency sine wave and a high-frequency square wave at the same or substantially the same frequency and at the same or substantially the same phase are provided.

5 Claims, 3 Drawing Sheets

PLASMA PROCESSING METHOD AND APPARATUS

BACKGROUND OF THE INVENTION

1. Field of the Invention

The present invention relates to a plasma processing method and apparatus for processing a target substance contained in gas by using atmospheric-pressure plasma.

2. Description of the Related Art

Air pollution, caused by gas containing volatile compounds and the like, and its impact on the human body have been a focus of attention in recent years. Technologies for decomposing (in particular, detoxifying) gas, such as volatile organic compounds (VOCs), by plasma discharge, especially by nonequilibrium plasma discharge, have been a focus of attention and studied, and methods and apparatuses based on such technologies have been proposed. One of the major factors affecting the decomposition of gas containing volatile compounds and the like is a waveform of applied voltage. Examples of waveforms of applied voltage include waveforms of high-frequency sine-wave alternating voltage, high-frequency square-wave alternating voltage, and, as described in Japanese Patent Laid-Open No. 2000-325735, a waveform generated by superimposing a high-voltage pulse on a commercial-frequency high voltage. These waveforms are applied between electrodes, and cause electrons to vibrate between the electrodes in the direction of the electric field and to collide with gas molecules containing volatile compounds and the like. The gas is thus decomposed by collision ionization. "High frequencies" here mean frequencies ranging from several kHz to several tens of kHz, while a "commercial frequency" means a frequency of 50 or 60 Hz.

However, sufficient processing efficiency typically cannot be achieved, even if the high-frequency sine-wave alternating voltage is used. Moreover, the use of high-frequency square-wave alternating voltage causes heat generation, which prevents high power efficiency from being achieved. Furthermore, when a commercial-frequency power-supply is used, discharge takes place according to a mechanism similar to that of direct voltage. Thus the sparkover voltage increases and a large amount of input power is required.

SUMMARY OF THE INVENTION

Accordingly, the present invention provides a gas-processing method and apparatus that can achieve high processing efficiency and high power efficiency.

According to the present invention, in a plasma processing method in which gas containing a target substance is processed by using atmospheric-pressure plasma, the target substance is processed by using the atmospheric-pressure plasma produced by a composite waveform, wherein the composite waveform is generated by superimposing a high-frequency sine wave and a high-frequency square wave at the same or substantially the same frequency and at the same or substantially the same phase.

Moreover, in a plasma processing apparatus including a pair of electrodes and a plasma reactor accommodating the pair of electrodes, wherein a target substance contained in gas is processed by using atmospheric-pressure plasma produced by a high-frequency wave applied to the pair of electrodes, the plasma processing apparatus of the present invention further includes wave-generating means for generating a high-frequency composite wave from a high-frequency sine wave and a high-frequency square wave; and amplifying means for amplifying the high-frequency composite wave.

In the present invention, by superimposing a high-frequency sine wave and a high-frequency square wave at the same or substantially the same frequency of several kHz to several tens of kHz and at the same or substantially the same phase, the efficiency of decomposition can be improved by a sharply-rising (or falling) portion derived from the square wave. In addition, heat generation can be reduced and power efficiency can be improved by a sloping portion derived from the sine wave. Therefore, target substances, such as volatile organic compounds, that are contained in gas can be more efficiently processed.

Further features and advantages of the present invention will become apparent from the following description of exemplary embodiments with reference to the attached drawings.

DESCRIPTION OF THE EMBODIMENTS

Figure 1:
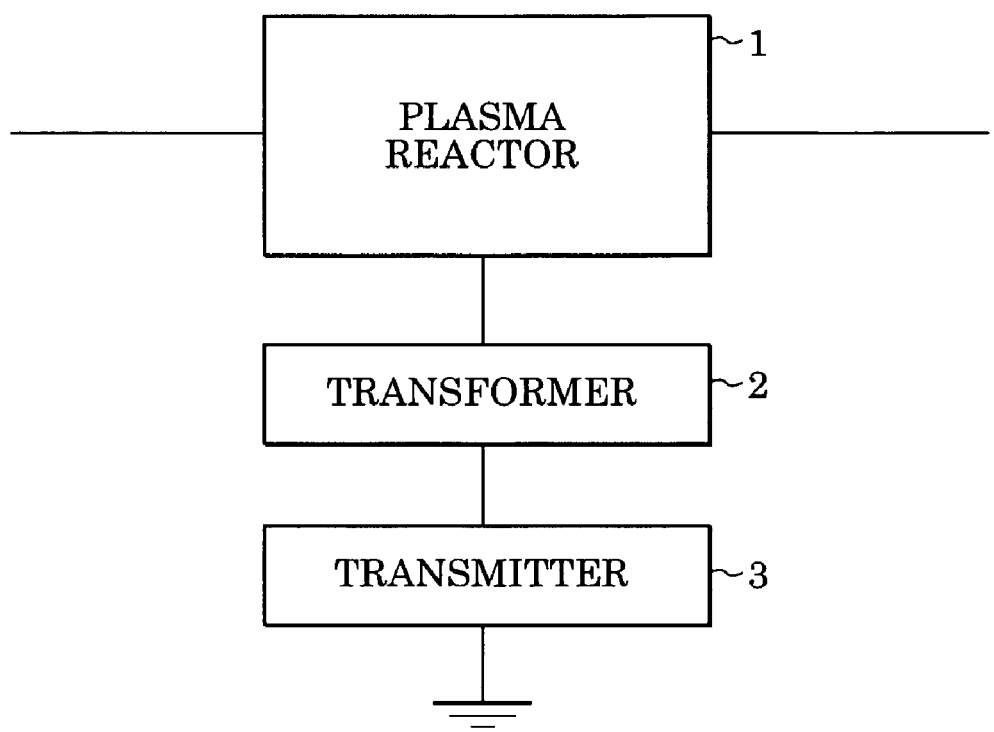
FIG. 1 is a block diagram of a gas-processing apparatus according to an embodiment of the present invention.

The present inventor has found that the reason for low processing efficiency when only the high-frequency, i.e. several kHz to several tens of kHz, sine-wave alternating voltage is used is due to the gradual rise or fall, derived from the sine wave.

A sharp rise can be achieved using a square wave. More particularly, there is a sharply-rising portion in the square wave when only the high-frequency square-wave alternating voltage is used. However, a time period during which no discharge takes place occurs after the rise. This causes power to be partially converted into heat, which does not contribute to the decomposition of gas, and thus leads to a significant decrease in power efficiency. According to the present invention, increased processing and power efficiency can be achieved using a range of high frequencies from several kHz to several tens of kHz, using a composite waveform generated by superimposing a high-frequency sine wave and a high-frequency square wave.

Moreover, as discussed in more detail below, greater power and processing efficiencies can be achieved by superimposing the waves and using the same or substantially the same frequencies and phases. In other words, power and processing efficiencies are impacted when the high-frequency sine-wave alternating voltage and the high-frequency square-wave alternating voltage are independently applied between electrodes, that is, at different frequencies or phases.

The present inventor makes use of the advantages of both the high-frequency sine-wave alternating voltage and the high-frequency square-wave alternating voltage. It does so by generating a waveform that superimposes the high-frequency sine-wave alternating voltage and the high-frequency square-wave alternating voltage.

The use of an applied-voltage waveform having both a sharply-rising portion derived from the square wave and a gradually-sloping portion derived from the sine wave allows for continuous discharge without interruption, even if the polarity is instantaneously inverted. Such a waveform achieves processing efficiency and increased power efficiency. The "processing" here means the processing of target substances contained in gas. The "target substances" mean, for example, substances to be decomposed, and in particular, volatile compounds such as VOCs. The present invention is applicable, for example, to the cleaning of gas containing contaminants, to the elimination of odor caused by components, such as ammonia and methane, and to the removal of microbes and viruses in the air.

More specifically, for example, the present invention is applicable to technologies for decomposing contaminants in gas collected from soil, and to technologies for the elimination of odor and for sanitization in public spaces such as hospitals, hotels, and movie theaters, and in private spaces such as houses and cars.

While the present invention is described with reference to the processing of gas containing volatile compounds, and described with reference to the attached drawings, the present invention is not limited to this type of processing.

A gas-processing method according to an embodiment of the present invention is a plasma processing method for processing gas containing volatile compounds by using atmospheric-pressure plasma. This embodiment is concerned with a gas-processing method in which a waveform generated by superimposing two voltage waveforms of a high-frequency (ranging from several to several tens of kHz) alternating voltage and a high-frequency square-wave alternating voltage at substantially the same frequency and at substantially the same phase is applied between a high-voltage electrode and a grounding electrode. The superimposing of the two voltage waveforms allows for efficient discharge to take place. A gas-processing apparatus that can implement the gas-processing method of the preferred embodiment will now be described with reference to the drawings.

Figure 2:
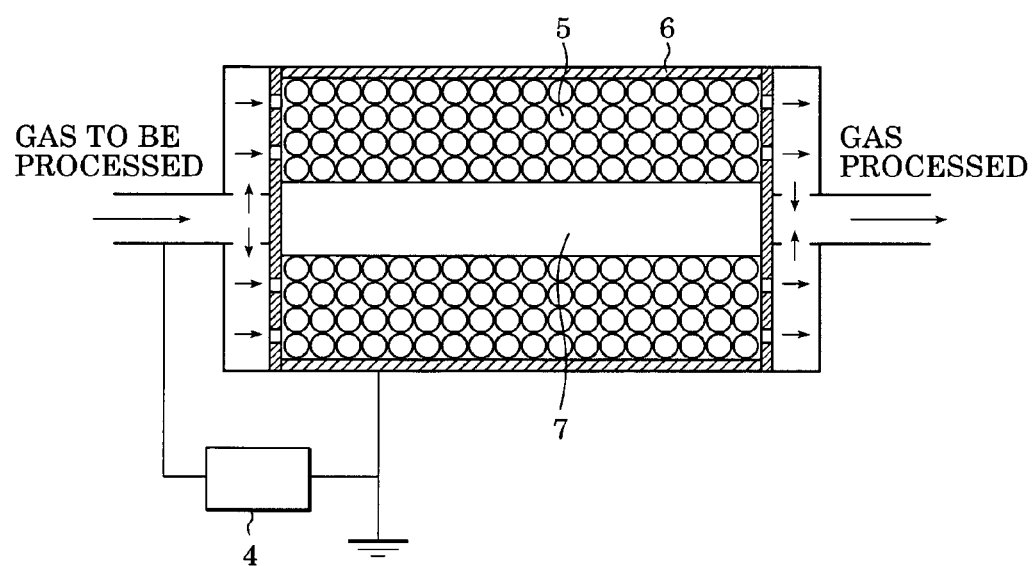
FIG. 2 is a schematic diagram of a plasma reactor in FIG. 1.

FIG. 1 is a block diagram of the gas-processing apparatus according to an embodiment of the present invention. The apparatus includes a plasma reactor 1, a transformer 2 serving as amplifying means, and a transmitter 3 serving as wave-generating means. The transmitter 3 transmits waveforms and is provided for superimposing a sine wave and a square wave. The transformer 2 amplifies the resultant waveform, for example, by 1000 times. The amplified waveform is applied between the electrodes (not shown) of the plasma reactor 1. FIG. 2 is a schematic diagram of the detailed internal structure of the plasma reactor 1 in FIG. 1. The plasma reactor 1 includes a high-voltage power supply 4, dielectric particles 5, a grounding electrode 6, and a high-voltage electrode 7. While not shown in FIG. 1, the high-voltage power supply 4 combines the functions of the transformer 2 and the transmitter 3.

The plasma reactor 1 has the grounding electrode 6 on the outside and the high-voltage electrode 7 in the middle. The space between the electrodes is filled with the dielectric particles 5, each being, for example, cylindrical pellet-like or spherical in shape.

Figure 3:
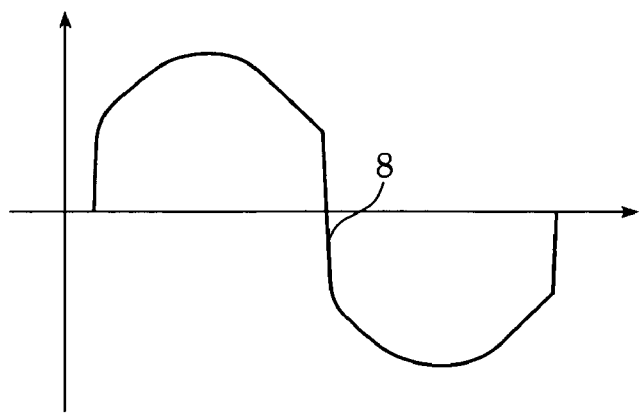
FIG. 3 shows a superimposed waveform of applied voltage.
Figure 4:
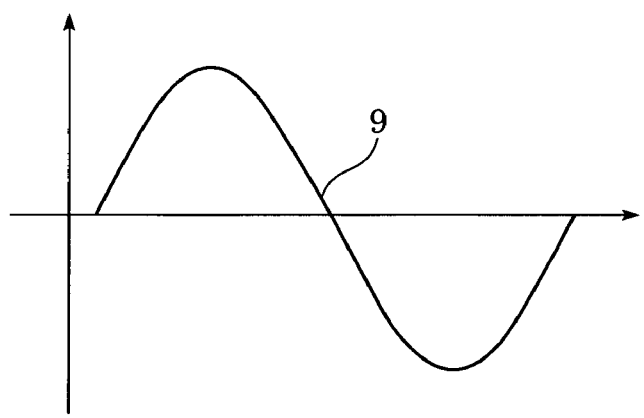
FIG. 4 shows a waveform of high-frequency sine-wave alternating voltage.
Figure 5:
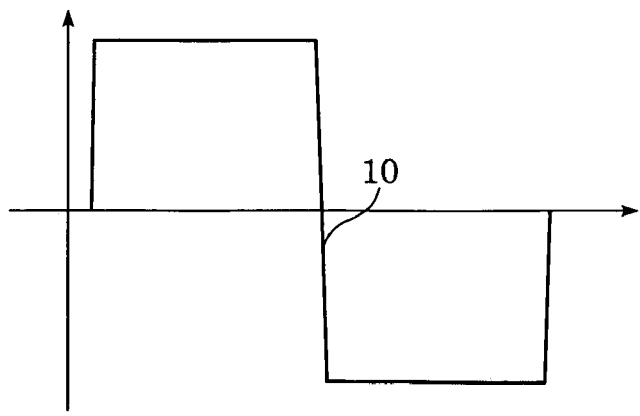
FIG. 5 shows a waveform of high-frequency square-wave alternating voltage.

According to this embodiment, the grounding electrode 6, which is substantially tubular in shape, surrounds the bar-like high-voltage electrode 7, which is internally disposed. Both electrodes face each other across the length of the high-voltage electrode 7. A high voltage applied from the high-voltage power supply 4 to the high-voltage electrode 7 and increased to the sparkover voltage or above allows stable and uniform glow discharge to take place under atmospheric pressure. Then, gas containing volatile compounds is fed into the plasma reactor 1, where the glow discharge occurs, and is decomposed. The glow discharge takes place in pore spaces between dielectric particles 5. The gas enters the plasma reactor 1 in the longitudinal direction of the high-voltage electrode 7 and exits therefrom. To evenly distribute the gas to be processed within the plasma reactor 1, a plurality of vents are arranged before and behind the space in which the dielectric particles 5 are provided. In FIG. 2, the high-voltage power supply 4 is connected to the grounding electrode 6 at one end, and is connected to a tube through which the gas to be processed passes at the other end. The tube is connected to the high-voltage electrode 7. FIG. 3 shows a composite waveform 8 of applied voltage according to the present embodiment. In FIG. 3, the horizontal axis indicates time, while the vertical axis indicates voltage. FIG. 4 and FIG. 5 show waveforms 9 and 10 of high-frequency sine-wave alternating voltage and high-frequency square-wave alternating voltage, respectively, before superimposing the waves. The horizontal and vertical axes indicate the same as those in FIG. 3. It is preferable that both waves 9 and 10 be superimposed at exactly the same frequency ranging from 1 kHz to 4 kHz and at exactly the same phase. In practice, however, a waveform with substantially the same frequency, and substantially the same phase, such as a frequency difference of ±10% and a phase difference of ±2%, can be referred to as a composite waveform, which can improve the processing efficiency and the power efficiency. Since, as shown in FIG. 3, the waveform 8 of a voltage applied between the electrodes includes both a sharply-rising (falling) portion derived from the square wave and a gradually-sloping portion, continuous discharge can be achieved without interruption, even if the polarity is instantaneously inverted. Thus, the power efficiency in decomposing the gas containing volatile compounds and the like can be improved.

EXAMPLES

While examples of the present invention will be described with reference to the drawings, the present invention is not limited by these examples. Experimental conditions for the examples and comparative examples described below are as follows:

Experimental apparatus

Gas-Processing Apparatus:
  γ alumina with a particle diameter of 3 mm

Coaxial-Cylindrical Packed-Bed-Type Discharge Apparatus Reactor Size:
  Outside $\phi$=14 mm, inside $\phi$=11.5 mm, length=48 mm Sample Gas:
  Methyl mercaptan (10 ppm; contained in nitrogen gas)
  Processing condition
  Gas flow rate: 1 L/min
  Power consumption: 0.88 W Example 1

A Composite Wave Generated by Superimposing Waves at the Same Frequency and at the Same Phase was Used In EXAMPLE 1, an experiment to ascertain the effect of processing of a target substance was carried out using the gas-processing apparatus shown in FIG. 2. A waveform of voltage to be applied between the high-voltage electrode and the grounding electrode was a new waveform, as shown in FIG. 3, and was generated by superimposing two voltage waveforms of a normal high-frequency alternating voltage and a high-frequency square-wave alternating voltage at the same frequency of 1 kHz and at the same phase. The gas to be processed, which was $N_2$-based gas containing 10 ppm of methyl mercaptan, was fed into the gas-processing apparatus. Then, a voltage of 17.44 kVp-p (0.88 W) was applied between the high-voltage electrode and the grounding electrode to cause plasma discharge to occur, thereby processing the $N_2$-based gas. The power factor at this point was 0.73. The analysis of the gas processed and emitted from the gas-processing apparatus, using a gas-detecting tube, showed that the processing rate of methyl mercaptan was 90%. The temperature of the processed gas at this point was 52.3° C.

Example 2

A Composite Wave Generated by Superimposing Waves at the Same Frequency and with a One-Period Phase Difference was Used In EXAMPLE 2, an experiment to ascertain the effect of processing of a target substance was carried out using the gas-processing apparatus shown in FIG. 2. A waveform of voltage to be applied between the high-voltage electrode and the grounding electrode was a waveform generated by superimposing two voltage waveforms of a normal high-frequency alternating voltage and a high-frequency square-wave alternating voltage at the same frequency of 1 kHz and with a phase difference of 360 degrees. The gas to be processed, which was $N_2$-based gas containing 10 ppm of methyl mercaptan, was fed into the gas-processing apparatus. Then, a voltage was applied between the high-voltage electrode and the grounding electrode to cause plasma discharge to occur, thereby processing the $N_2$-based gas. The analysis of the gas processed and emitted from the gas-processing apparatus, using a gas-detecting tube, showed that the processing rate of methyl mercaptan was 90%.

Example 3

A Composite Wave Generated by Superimposing Waves at Slightly Different Frequencies and at the Same Phase was Used In EXAMPLE 3, an experiment to ascertain the effect of processing of a target substance was carried out using the gas-processing apparatus shown in FIG. 2. A waveform of voltage to be applied between the high-voltage electrode and the grounding electrode was a waveform generated by superimposing two voltage waveforms of a normal high-frequency alternating voltage (frequency: 1 kHz) and a high-frequency square-wave alternating voltage (frequency: 900 Hz or 1.1 kHz). Both waves were superimposed at the same phase. The gas to be processed, which was $N_2$-based gas containing 10 ppm of methyl mercaptan, was fed into the gas-processing apparatus. Then, a voltage was applied between the high-voltage electrode and the grounding electrode to cause plasma discharge to occur, thereby processing the $N_2$-based gas. The analysis of the gas processed and emitted from the gas-processing apparatus, using a gas-detecting tube, showed that the processing rate of methyl mercaptan was 90%.

Example 4

A Composite Wave Generated by Superimposing Waves at the Same Frequency and with a Slight Phase Difference was Used In EXAMPLE 4, an experiment to ascertain the effect of processing of a target substance was carried out using the gas-processing apparatus shown in FIG. 2. A waveform of voltage to be applied between the high-voltage electrode and the grounding electrode was a waveform generated by superimposing two voltage waveforms of a normal high-frequency alternating voltage and a high-frequency square-wave alternating voltage at the same frequency of 1 kHz and with a phase difference of 355 degrees or 365 degrees. The gas to be processed, which was $N_2$-based gas containing 10 ppm of methyl mercaptan, was fed into the gas-processing apparatus. Then, a voltage was applied between the high-voltage electrode and the grounding electrode to cause plasma discharge to occur, thereby processing the $N_2$-based gas. The analysis of the gas processed and emitted from the gas-processing apparatus, using a gas-detecting tube, showed that the processing rate of methyl mercaptan was 90%.

Comparative Example 1

In COMPARATIVE EXAMPLE 1, an experiment to ascertain the effect of processing of a target substance was carried out using the gas-processing apparatus shown in FIG. 2. A waveform of voltage to be applied between the high-voltage electrode and the grounding electrode was a voltage waveform of a high-frequency sine-wave alternating voltage as shown in FIG. 4. The frequency was 1 kHz. The gas to be processed, which was $N_2$-based gas containing 10 ppm of methyl mercaptan, was fed into the gas-processing apparatus. Then, a voltage of 17.70 kVp-p (0.88 W) was applied between the high-voltage electrode and the grounding electrode to cause plasma discharge to occur, thereby processing the $N_2$-based gas. The analysis of the gas processed and emitted from the gas-processing apparatus, using a gas-detecting tube, showed that the processing rate of methyl mercaptan was 80%.

Comparative Example 2

Improvement of Power Efficiency by Preventing Heat Generation

In COMPARATIVE EXAMPLE 2, an experiment to ascertain the effect of prevention of heat generation and the improvement of power efficiency was carried out using the gas-processing apparatus shown in FIG. 2. A waveform of voltage to be applied between the high-voltage electrode and the grounding electrode was a voltage waveform of a high-frequency square-wave alternating voltage as shown in FIG. 5. The frequency was 1 kHz. The gas to be processed, which was $N_2$-based gas containing 10 ppm of methyl mercaptan, was fed into the gas-processing apparatus. The temperature of the gas to be processed was 23.6° C. at this point. Then, a voltage of 17.56 kvp-p (0.88 W) was applied between the high-voltage electrode and the grounding electrode to cause plasma discharge to occur, thereby processing the $N_2$-based gas. The power factor at this point was 0.68. The analysis of the gas processed and emitted from the gas-processing apparatus, using a gas-detecting tube, showed that the processing rate of methyl mercaptan was 80%. The temperature of the processed gas at this point was 68.2° C.

Comparative Example 3

A Composite Wave Generated by Superimposing Waves at the Same Frequency and with a Large Phase Difference was Used In COMPARATIVE EXAMPLE 3, an experiment to ascertain the effect of processing of a target substance was carried out using the gas-processing apparatus shown in FIG. 2. A waveform of voltage to be applied between the high-voltage electrode and the grounding electrode was a waveform generated by superimposing two voltage waveforms of a normal high-frequency alternating voltage and a high-frequency square-wave alternating voltage at the same frequency of 1 kHz and with a phase difference ranging from 10 to 350 degrees. The gas to be processed, which was $N_2$-based gas containing 10 ppm of methyl mercaptan, was fed into the gas-processing apparatus. Then, a voltage of 0.88 W was applied between the high-voltage electrode and the grounding electrode to cause plasma discharge to occur, thereby processing the $N_2$-based gas. The analysis of the gas processed and emitted from the gas-processing apparatus, using a gas-detecting tube, showed that the processing rate of methyl mercaptan was 80 to 82%.

In EXAMPLES 1 and 2, compared to COMPARATIVE EXAMPLES 1 and 2, the processing rate of methyl mercaptan was improved by 10%. The power efficiency was improved by 7%, and the heat generation was reduced by 15.9° C. In addition, compared to COMPARATIVE EXAMPLE 3, the processing rate of methyl mercaptan was improved by 10% when the high-frequency alternating voltage and the high-frequency square-wave alternating voltage have the same phase. Thus, the processing efficiency and power efficiency can be improved by superimposing waves of the high-frequency alternating voltage and the high-frequency square-wave alternating voltage at the same or substantially the same frequency and at the same or substantially the same phase.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-089541 filed Mar. 25, 2004, which is hereby incorporated by reference herein.

What is claimed is:

1. A plasma processing method for processing gas containing a target substance by using atmospheric-pressure plasma, comprising the step of processing the target substance by using the atmospheric-pressure plasma produced by a composite waveform generated by superimposing a high-frequency sine wave and a high-frequency square wave,
wherein a frequency of the high-frequency sine wave and a frequency of the high-frequency square wave are substantially the same, and a phase of the high-frequency sine wave and a phase of the high-frequency square wave are substantially the same.

2. The plasma processing method according to claim 1, wherein the composite waveform comprises a rising and falling portion derived from the high-frequency square wave and a sloping portion derived from the high-frequency sine wave.

3. The plasma processing method according to claim 1, wherein the difference between the frequency of the high-frequency sine wave and the frequency of the high-frequency square wave is within ±10%, and the difference between the phase of the high-frequency sine wave and the phase of the high-frequency square wave is within ±2%.

4. A plasma processing apparatus comprising a pair of electrodes and a plasma reactor accommodating the pair of electrodes, wherein a target substance contained in gas is processed by using atmospheric-pressure plasma produced by a high-frequency wave applied to the pair of electrodes, the plasma processing apparatus further comprising:
wave-generating means for generating a high-frequency composite wave from a high-frequency sine wave and a high-frequency square wave; and
amplifying means for amplifying the high-frequency composite wave,
wherein a frequency of the high-frequency sine wave and a frequency of the high-frequency square wave are substantially the same, and a phase of the high-frequency sine wave and a phase of the high frequency wave are substantially the same.

5. The plasma processing apparatus according to claim 4, wherein the difference between the frequency of the high-frequency sine wave and the frequency of the high-frequency square wave is within ±10%, and the difference between the phase of the high-frequency sine wave and the phase of the high-frequency square wave is within ±2%.

* * * * *